(12) United States Patent
Boutier et al.

(10) Patent No.: US 8,951,432 B2
(45) Date of Patent: Feb. 10, 2015

(54) BINARY COMPOSITIONS OF 1,3,3,3-TETRAFLUOROPROPENE AND AMMONIA

(75) Inventors: Jean-Christophe Boutier, Oullins (FR); Wissam Rached, Chaponost (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/123,819

(22) PCT Filed: May 14, 2012

(86) PCT No.: PCT/FR2012/051069
§ 371 (c)(1),
(2), (4) Date: Dec. 4, 2013

(87) PCT Pub. No.: WO2012/168607
PCT Pub. Date: Dec. 13, 2012

(65) Prior Publication Data
US 2014/0110623 A1    Apr. 24, 2014

(30) Foreign Application Priority Data
Jun. 7, 2011 (FR) ..................... 11 54945

(51) Int. Cl.
*C09K 5/04* (2006.01)
*C11D 3/43* (2006.01)
(Continued)

(52) U.S. Cl.
CPC . *C11D 3/43* (2013.01); *C08J 9/127* (2013.01); *C09K 3/30* (2013.01); *C09K 5/045* (2013.01);
(Continued)

(58) Field of Classification Search
CPC ........................... C09K 2205/126; C09K 5/045
USPC ........................................ 252/67, 68; 521/99
See application file for complete search history.

(56) References Cited

U.S. PATENT DOCUMENTS

2006/0243945 A1    11/2006  Minor et al.
2008/0230738 A1     9/2008  Minor et al.
(Continued)

FOREIGN PATENT DOCUMENTS

WO    WO 2007/126414 A2    11/2007
WO    WO 2008/009922 A2     1/2008
(Continued)

OTHER PUBLICATIONS

M. S. Kim et al., "A Study to Determine the Existence of an Azeotropic R-22 'Drop-In' Substitute", NISTIR 5784, US Department of Commerce, Mar. 1996.*

(Continued)

*Primary Examiner* — John Hardee
(74) *Attorney, Agent, or Firm* — Buchanan Ingersoll & Rooney P.C.

(57) ABSTRACT

A binary composition of 1,3,3,3-tetrafluoropropene and ammonia, as well as to the use thereof, in particular as a heat-transfer fluid. The composition may include from 40% to 99% of ammonia and from 1% to 60% of 1,3,3,3-tetrafluoropropene; preferably from 60% to 98% of ammonia and from 2% to 40% of 1,3,3,3-tetrafluoropropene; preferably from 70% to 95% of ammonia and from 5% to 30% of 1,3,3,3-tetrafluoropropene; preferably from 75% to 90% of ammonia and from 10% to 25% of 1,3,3,3-tetrafluoropropene; preferably from 78% to 85% of ammonia and from 15% to 22% of 1,3,3,3-tetrafluoropropene. The 1,3,3,3-tetrafluoropropene may be in the cis form or in the trans form or is a mixture of cis form and trans form and in which, preferably, at least 80% or at least 90% or at least 95% or at least 98% or at least 99% of the 1,3,3,3-tetrafluoropropene is in the trans form.

21 Claims, 1 Drawing Sheet

(51) Int. Cl.
*C08J 9/12* (2006.01)
*C09K 3/30* (2006.01)
*C11D 7/50* (2006.01)
*B01F 17/00* (2006.01)

(52) U.S. Cl.
CPC ............ *C11D 7/5018* (2013.01); *C11D 7/5068* (2013.01); *B01F 17/0085* (2013.01); *C09K 2205/126* (2013.01); *C09K 2205/132* (2013.01); *C09K 2205/32* (2013.01)
USPC .............................................. 252/67; 521/99

(56) References Cited

U.S. PATENT DOCUMENTS

| | | | |
|---|---|---|---|
| 2009/0249809 A1 | 10/2009 | Minor et al. | |
| 2009/0249864 A1 | 10/2009 | Minor et al. | |
| 2009/0250650 A1 | 10/2009 | Minor et al. | |
| 2009/0255285 A1 | 10/2009 | Minor et al. | |
| 2009/0272931 A1 | 11/2009 | Minor et al. | |
| 2009/0277194 A1 | 11/2009 | Minor et al. | |
| 2009/0278072 A1 | 11/2009 | Minor et al. | |
| 2009/0288431 A1 | 11/2009 | Rao et al. | |
| 2009/0314015 A1 | 12/2009 | Minor et al. | |
| 2010/0090155 A1 | 4/2010 | Leck et al. | |
| 2010/0186432 A1 | 7/2010 | Perti et al. | |
| 2010/0200799 A1 | 8/2010 | Mouli | |
| 2010/0288965 A1 | 11/2010 | Howell et al. | |
| 2010/0288966 A1 | 11/2010 | Leck et al. | |
| 2011/0005723 A1 | 1/2011 | Mouli | |
| 2011/0041530 A1 | 2/2011 | Mouli et al. | |
| 2011/0204279 A1 | 8/2011 | Minor et al. | |
| 2012/0047925 A1 | 3/2012 | Rao et al. | |
| 2012/0074349 A1 | 3/2012 | Leck et al. | |
| 2012/0085110 A1 | 4/2012 | Howell et al. | |
| 2012/0168663 A1* | 7/2012 | Singh et al. | 252/2 |
| 2013/0283834 A1 | 10/2013 | Rao et al. | |

FOREIGN PATENT DOCUMENTS

| | | |
|---|---|---|
| WO | WO 2008/027512 A2 | 3/2008 |
| WO | WO 2008/027513 A2 | 3/2008 |
| WO | WO 2008/027514 A1 | 3/2008 |
| WO | WO 2008/027516 A1 | 3/2008 |
| WO | WO 2008/027517 A1 | 3/2008 |
| WO | WO 2008/027518 A2 | 3/2008 |
| WO | WO 2008/027519 A1 | 3/2008 |
| WO | WO 2008/027555 A2 | 3/2008 |
| WO | WO 2008/027594 A2 | 3/2008 |
| WO | WO 2008/027595 A1 | 3/2008 |
| WO | WO 2008/027596 A2 | 3/2008 |
| WO | WO 2008/042066 A1 | 4/2008 |
| WO | WO 2009/042855 A1 | 4/2009 |

OTHER PUBLICATIONS

International Search Report (PCT/ISA/210) mailed on Aug. 24, 2012, by the European Patent Office as the International Searching Authority for International Application No. PCT/FR2012/051069.

* cited by examiner

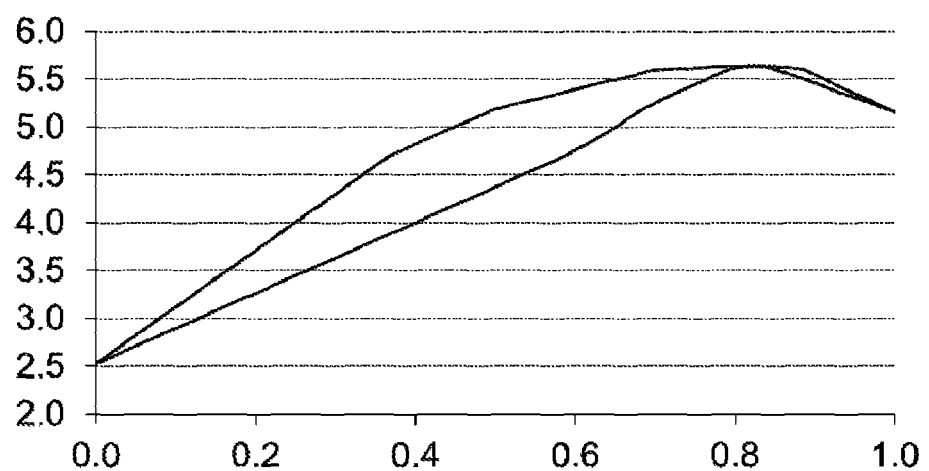

BINARY COMPOSITIONS OF 1,3,3,3-TETRAFLUOROPROPENE AND AMMONIA

FIELD OF THE INVENTION

The present invention relates to binary compositions of 1,3,3,3-tetrafluoropropene and to their use, in particular as heat-transfer fluids.

TECHNICAL BACKGROUND

Fluids based on fluorocarbon compounds are widely used in systems for the transfer of heat by compression of vapor, in particular air conditioning, heat pump, refrigeration or freezing devices. These devices have it in common that they are based on a thermodynamic cycle comprising the vaporization of the fluid at low pressure (in which the fluid absorbs heat); the compression of the vaporized fluid up to a high pressure; the condensation of the vaporized fluid to give a liquid at high pressure (in which the fluid discharges heat); and the reduction in pressure of the fluid in order to complete the cycle.

The choice of a heat-transfer fluid (which can be a pure compound or a mixture of compounds) is dictated, on the one hand, by the thermodynamic properties of the fluid and, on the other hand, by additional constraints. Thus, a particularly important criterion is that of the impact of the fluid under consideration on the environment. In particular, chlorinated compounds (chlorofluorocarbons and hydrochlorofluorocarbons) exhibit the disadvantage of damaging the ozone layer. Thus, nonchlorinated compounds, such as hydrofluorocarbons, fluoroethers and fluoroolefins, are from now on generally preferred to them.

However, it is necessary to develop other heat-transfer fluids exhibiting a lower global warming potential (GWP) than that of the heat-transfer fluids currently used and exhibiting equivalent or improved performances.

The use of ammonia as heat-transfer fluid is known. However, a number of problems are associated with this compound: a very high compressor outlet temperature, in comparison with hydrofluorocarbons; an absence of oil return and the need to install an oil separator; an authorized total charge sometimes limited due to the toxicity of the product.

The document WO 2007/126414 describes a large number of mixtures of heat-transfer compounds and in particular mixtures "comprising" 1,3,3,3-tetrafluoropropene (HFO-1234ze) and ammonia. No example of a composition comprising these two compounds (whether with or without additional compounds) is provided, nor any relative concentration range for these compounds.

The document US 2006/0243945 describes a large number of mixtures of heat-transfer compounds and in particular mixtures comprising HFO-1234ze and mixtures comprising ammonia, but the combination of these two compounds is not disclosed.

The document WO 2008/009922 describes heat-transfer compositions, in particular based on 1,2,3,3,3-pentafluoropropene (HFO-1225ye) and on tetrafluoropropene (HFO-1234) generally (preferably 2,3,3,3-tetrafluoropropene or HFO-1234yf), which can comprise additional compounds chosen from a list comprising in particular ammonia.

The document WO 2008/027555 describes heat-transfer compositions, in particular based on HFO-1225ye or based on HFO-1234yf, which can comprise an additional compound which can in particular be ammonia.

However, there still exists a need to develop other heat-transfer fluids which exhibit a relatively low GWP and which are capable of replacing the ordinary heat-transfer fluids.

In particular, it is desirable to develop other heat-transfer fluids having a low GWP which are quasi-azeotropic, indeed even azeotropic, and/or which exhibit good energy performances, in comparison with ordinary heat-transfer fluids (such as R404A or R410A).

SUMMARY OF THE INVENTION

The invention relates first to a binary composition of 1,3,3,3-tetrafluoropropene and ammonia.

According to one embodiment, the composition comprises:
  from 40% to 99% of ammonia and from 1% to 60% of 1,3,3,3-tetrafluoropropene;
  preferably from 60% to 98% of ammonia and from 2% to 40% of 1,3,3,3-tetrafluoropropene;
  preferably from 70% to 95% of ammonia and from 5% to 30% of 1,3,3,3-tetrafluoropropene;
  preferably from 75% to 90% of ammonia and from 10% to 25% of 1,3,3,3-tetrafluoropropene;
  preferably from 78% to 85% of ammonia and from 15% to 22% of 1,3,3,3-tetrafluoropropene.

According to one embodiment, the 1,3,3,3-tetrafluoropropene is in the cis form or in the trans form or is a mixture of cis form and trans form and, preferably, at least 80% or at least 90% or at least 95% or at least 98% or at least 99% of the 1,3,3,3-tetrafluoropropene is in the trans form.

The invention also relates to the use of the above composition as heat-transfer fluid.

According to one embodiment, the composition is quasi-azeotropic, preferably azeotropic.

The invention also relates to a heat-transfer composition comprising the above composition and also one or more additives chosen from lubricants, stabilizing agents, surfactants, tracers, fluorescent agents, odorous agents, solubilizing agents and their mixtures, said heat-transfer composition preferably comprising at least one stabilizing agent.

The invention also relates to a heat-transfer installation comprising a vapor compression circuit containing the composition according to the invention as heat-transfer fluid or containing the heat-transfer composition according to the invention.

According to one embodiment, the installation is chosen from mobile or stationary installations for heat-pump heating, air conditioning, refrigeration or freezing and Rankine cycles and in particular from motor vehicle air conditioning systems.

The invention also relates to a process for heating or cooling a liquid or a body by means of a vapor compression circuit comprising a heat-transfer fluid, said process successively comprising the evaporation of the heat-transfer fluid, the compression of the heat-transfer fluid, the condensation of the heat fluid and the reduction in pressure of the heat-transfer fluid, in which the heat-transfer fluid is a composition according to the invention.

According to one embodiment, the process is a process for cooling a fluid or a body, in which the temperature of the cooled fluid or body is from −15° C. to 15° C. and preferably from −10° C. to 10° C., more particularly preferably from −5° C. to 5° C.; or is a process for heating a fluid or a body, in which the temperature of the heated fluid or body is from 30° C. to 90° C. and preferably from 35° C. to 60° C., more particularly preferably from 40° C. to 50° C.

According to one embodiment, the process is a process for cooling a fluid or a body, in which the temperature of the cooled fluid or body is from −40° C. to −10° C. and preferably from −35° C. to −25° C., more particularly preferably from −30° C. to −20° C.

According to one embodiment, the process is a process for heating a fluid or a body, in which the temperature of the heated fluid or body is greater than 90° C., preferably greater than or equal to 100° C. or greater than or equal to 110° C., and preferably less than or equal to 120° C.

The invention also relates to a process for reducing the environmental impact of a heat-transfer installation comprising a vapor compression circuit containing an initial heat-transfer fluid, said process comprising a stage of replacement of the initial heat-transfer fluid in the vapor compression circuit by a final transfer fluid, the final transfer fluid exhibiting a lower GWP than the initial heat-transfer fluid, in which the final heat-transfer fluid is a composition according to the invention.

The invention also relates to the use of the composition according to the invention as solvent.

The invention also relates to the use of the composition according to the invention as blowing agent.

The invention also relates to the use of the composition according to the invention as propellant, preferably for an aerosol.

The invention also relates to the use of the composition according to the invention as cleaning agent.

The present invention makes it possible to meet the needs felt in the state of the art. It more particularly provides novel low-GWP compositions capable of being used (inter alia) as heat-transfer fluids, in particular as replacement for ordinary heat-transfer fluids.

In particular, the invention provides azeotropic or quasi-azeotropic compositions.

In some embodiments, the invention provides heat-transfer fluids which exhibit good energy performances in comparison with ordinary heat-transfer fluids.

In some embodiments, the compositions according to the invention exhibit in particular an improved volumetric capacity and/or an improved coefficient of performance in comparison with the compositions of the state of the art.

Finally, the invention makes it possible to partially or completely overcome the problems conventionally associated with ammonia and listed above.

BRIEF DESCRIPTION OF THE FIGURES

FIG. 1 represents the vapor/liquid equilibrium data at 5° C. of binary mixtures of trans-1,3,3,3-tetrafluoro-1propene (HFO-1234ze) and NH3. (HFO-1234ze) and NH3, demonstrating the existence of an azeotrope and of quasiazeotropes. The proportion of NH3 between 0 and 1 (=100%) is represented on the abscissa and the pressure in bars is represented on the ordinate.

DESCRIPTION OF EMBODIMENTS OF THE INVENTION

The invention is now described in more detail and without implied limitation in the description which follows.

Unless otherwise mentioned, throughout the patent application, the proportions of compounds indicated are given as molar percentages.

According to the present patent application, the global warming potential (GWP) is defined with respect to carbon dioxide and with respect to a duration of 100 years, according to the method indicated in "The Scientific Assessment of Ozone Depletion, 2002, a Report of the World Meteorological Association's Global Ozone Research and Monitoring Project".

The term "heat-transfer compound", respectively "heat-transfer fluid" (or refrigerant), is understood to mean a compound, respectively a fluid, capable of absorbing heat on evaporating at low temperature and low pressure and of discharging heat on condensing at high temperature and high pressure, in a vapor compression circuit. Generally, a heat-transfer fluid can comprise just one, two, three or more than three heat-transfer compounds.

The term "heat-transfer composition" is understood to mean a composition comprising a heat-transfer fluid and optionally one or more additives which are not heat-transfer compounds for the application envisaged.

The additives can in particular be chosen from lubricants, stabilizing agents, surfactants, tracers, fluorescent agents, odorous agents and solubilizing agents.

The stabilizing agent or agents, when they are present, preferably represent at most 5% by weight in the heat-transfer composition.

The stabilizing agents can be chosen in particular from amine compounds, in particular from triethylamine, tributylamine, diisopropylamine, triisopropylamine, triisobutylamine, p-phenylenediamine, diphenylamine, dialkylamines, N-(1-methylethyl)-2-propylamine, piperidyl, piperidinyl, piperazinone and alkoxypiperidinyl compounds exhibiting alkyl substituents, 2,2,6,6-tetramethyl-4-piperidone, 2,2,6,6-tetramethyl-4-piperidinol, bis(1,2,2,6,6-pentamethylpiperidyl)sebacate, di(2,2,6,6-tetramethyl-4-piperidyl)sebacate, poly(N-hydroxyethyl-2,2,6,6-tetramethyl-4-hydroxypiperidyl succinate) and the combinations of these. A detailed description of these stabilizing agents appears, for example, in the document WO 2008/042066.

The stabilizing agents can also be chosen from benzophenone derivatives and in particular from 2,5-difluorobenzophenone, 2',5'-dihydroxyacetophenone, 2-aminobenzophenone, 2-chlorobenzophenone, 2-fluorobenzophenone, 2-hydroxybenzophenone, 2-methylbenzophenone, 2-amino-4'-chlorobenzophenone, 2-amino-4'-fluorobenzophenone, 2-amino-5-bromo-2'-chlorobenzophenone, 2-amino-5-chlorobenzophenone, 2-amino-5-chloro-2'-fluorobenzophenone, 2-amino-5-nitrobenzophenone, 2-amino-5-nitro-2'-chlorobenzophenone, 2-amino-2',5-dichlorobenzophenone, 2-chloro-4'-fluorobenzophenone, 2-hydroxy-4-methoxybenzophenone, 2-hydroxy-5-chlorobenzophenone, 2-methylamino-5-chlorobenzophenone, 3-methylbenzo-phenone, 3-nitrobenzophenone, 3-nitro-4'-chloro-4-fluorobenzophenone, 4-chlorobenzophenone, 4-fluorobenzophenone, 4-hydroxybenzophenone, 4-methoxybenzophenone, 4-methylbenzophenone, 4-nitrobenzophenone, 4-phenylbenzophenone, 4-chloro-3-nitrobenzophenone, 4-hydroxy-4'-chloro-benzophenone, 2,4-dihydroxybenzophenone, 2,4-dimethylbenzophenone, 2,5-dimethylbenzophenone, 3,4-diaminobenzophenone, 3,4-dichlorobenzophenone, 3,4-difluorobenzophenone, 3,4-dihydroxybenzophenone, 3,4-dimethylbenzo-phenone, 4,4'-bis(diethylamino)benzophenone, 4,4'-bis(dimethylamino)benzophenone, 4,4'-dichlorobenzophenone, 4,4'-difluorobenzophenone, 4,4'-dihydroxybenzophenone, 4,4'-dimethoxybenzophenone, and the combinations of these. A detailed description of these stabilizing agents appears, for example, in the document WO 2008/027596.

The stabilizing agents can also be chosen from phenol compounds and in particular from 2,6-di(tert-butyl)-4-methylphenol, 2,6-di(tert-butyl)-4-ethylphenol, 2,4-dimethyl-6-

(tert-butyl)phenol, tocopherol, hydroquinone, t-butylhydroquinone, 4,4'-thiobis(2-methyl-6-(tert-butyl)phenol), 4,4'-thiobis(3-methyl-6-(tert-butyl)phenol), 2,2'-thiobis(4-methyl-6-(tert-butyl)phenol), 4,4'-methylenebis(2,6-di(tert-butyl)phenol), 4,4'-bis(2,6-di(tert-butyl)phenol), 2,2'-methylenebis(4-ethyl-6-(tert-butyl)phenol), 2,2'-methylenebis(4-methyl-6-(tert-butyl)phenol), 4,4'-butylidenebis(3-methyl-6-(tert-butyl)phenol), 4,4'-isopropylidenebis(2,6-di(tert-butyl)phenol), 2,2'-methylenebis(4-methyl-6-nonylphenol), 2,2'-isobutylidenebis(4,6-dimethylphenol), 2,2'-methylenebis(4-methyl-6-cyclohexylphenol), 2,2'-methylenebis(4-ethyl-6-(tert-butyl)phenol), butylated hydroxytoluene (BHT), 2,6-di(tert-α-dimethylamino)-p-cresol, 4,4'-thiobis(6-(tert-butyl)-m-cresol), acylaminophenols, 2,6-di(tert-butyl)-4-(N,N'-dimethylaminomethyl)phenol, bis(3-methyl-4-hydroxy-5-(tert-butyl)benzyl)sulfide, bis(3,5-di(tert-butyl)-4-hydroxybenzyl)sulfide, and the combinations of these. A detailed description of these stabilizing agents appears, for example, in the document WO 2008/027594.

The stabilizing agents can also be chosen from alkylsilane compounds and in particular from substituted silanes of formula $Si_nR_{2n+2}$, where each R independently represents H, an additional silyl group, an alkyl group, an alkoxy group, an amine group, a vinyl group or a phenyl group and where the R group can be substituted by halogens or amine groups. bis(Dimethylamino)methylsilane, tris(trimethylsilyl)silane, vinyltriethoxysilane and vinyltrimethoxysilane are preferred. A detailed description of these stabilizing agents appears, for example, in the document WO 2008/027595.

The stabilizing agents can also be chosen from ionic liquids and in particular ionic liquids comprising a cation chosen from pyridinium, pyridazinium, pyrimidinium, pyrazinium, imidazolium, pyrazolium, thiazolium, oxazolium, triazolium, phosphonium and ammonium cations, said cations optionally being substituted, and comprising an anion chosen from $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$ and fluorinated anions. A detailed description of these stabilizing agents appears, for example, in the document WO 2009/042855.

The stabilizing agents can also be chosen from oxetanes of formula:

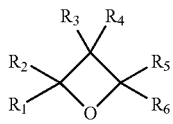

where the $R_1$ to $R_6$ groups are identical or different and can be chosen from hydrogens, substituted or unsubstituted alkyls and substituted or unsubstituted aryls, and in particular from 3-ethyl-3-hydroxymethyloxetane, 3-ethyl-3-(phenoxymethyl)oxetane and 3-ethyl-3-((2-ethylhexyloxy)methyl)-oxetane. A detailed description of these stabilizing agents appears, for example, in the document WO 2008/027519.

The stabilizing agents can also be chosen from thiols and in particular from methanethiol, ethanethiol, coenzyme A, dimercaptosuccinic acid, (R)-2-(4-methylcyclohex-3-enyl)propane-2-thiol, cysteine and lipoamide, and/or from thioesters, in particular from benzyl phenyl sulfide, diphenyl sulfide, dibenzyl sulfide, dioctadecyl 3,3'-thiodipropionate, didodecyl 3,3'-thiopropionate, and the combinations of these.

A detailed description of these stabilizing agents appears, for example, in the document WO 2008/027517.

The stabilizing agents can also be chosen from ascorbic acid, terephthalate (in particular divinyl terephthalate or diphenyl terephthalate), nitromethane and the combinations of these. A detailed description of the stabilizing agents appears, for example, in the document WO 2008/027518.

The stabilizing agents can also be chosen from lactones and in particular from γ-butyrolactone, glucona δ-lactone, γ-undecalactone, 6,7-dihydro-4(5H)-benzofuranone, 5,7-bis(1,1-dimethylethyl)-3-[2,3(or 3,4)-dimethylphenyl]-2(3H)-benzofuranone and the combinations of these. A detailed description of these stabilizing agents appears, for example, in the document WO 2008/027516.

The stabilizing agents can also be chosen from terpenes, terpenoides and fullerenes and in particular from isoprene, myrcene, allo-ocimene, β-ocimene, terebene, limonene, retinal, pinene, menthol, geraniol, farnesol, phytol, vitamin A, terpinene, $\Delta^3$-carene, terpinolene, phellandrene, fenchene, lycopene, β-carotene, zeaxanthin, hepaxanthin, isotretinoin, abietane, ambrosane, aristolane, atisane, beyerane, bisabolane, bornane, caryophyllane, cedrane, dammarane, drimane, eremophilane, eudesmane, fenchane, gammacerane, germacrane, gibbane, grayanotoxane, guaiane, himachalane, hopane, humulane, kaurane, labdane, lanostane, lupane, p-menthane, oleanane, ophiobolane, picrasane, pimarane, pinane, podocarpane, protostane, rosane, taxane, thujane, trichothecane, ursane, buckminsterfullerene, [5,6]-fullerene-$C_{70}$, fullerene-$C_{76}$, fullerene-$C_{78}$ and fullerene-$C_{84}$ and the combinations of these. A detailed description of these stabilizing agents appears, for example, in the document WO 2008/027514.

The stabilizing agents can also be chosen from aryl alkyl ethers, polyoxyalkylenated aromatic compounds or alkylated aromatic compounds (linear or branched alkylbenzene lubricants) and in particular from the compounds of formula:

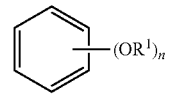

where n has the value 1, 2 or 3 and $R^1$ is an alkyl group comprising from 1 to 16 carbon atoms or a polyoxyalkylene group comprising at least one $-CH_2CH_2O-$ group, and the combinations of these. Examples are anisole, 1,4-dimethoxybenzene, 1,4-diethoxybenzene and 1,3,5-trimethoxybenzene. A detailed description of these stabilizing agents appears, for example, in the document WO 2008/027513.

The stabilizing agents can also be chosen from functionalized perfluoropolyethers and in particular from those described in detail in document WO 2008/027512 (in particular from p. 20, l.1 to p. 25, l.5).

The stabilizing agents can also be chosen from epoxides and in particular from 1,2-propylene oxide, 1,2-butylene oxide, butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, glycidyl methylphenyl ether, 1,4-glycidyl phenyl diether, 4-methoxyphenyl glycidyl ether, naphthyl glycidyl ether, 1,4-diglycidyl naphthyl diether, butylphenyl glycidyl ether, n-butyl glycidyl ether, isobutyl glycidyl ether, hexanediol diglycidyl ether, allyl glycidyl ether, polypropylene glycol diglycidyl ether and the combinations of these.

The stabilizing agents can also be:

a thiophosphate, in particular as described in the document WO 2008/027512 on p. 25, l.7-17;

a butylated triphenyl phosphorothionate, in particular as described in the document WO 2008/027512 on p. 25, l.18-26;

an organophosphate, in particular as described in the document WO 2008/027512 on p. 26, l.1-p. 27, l.2;

a phosphite, in particular as described in the document WO 2008/027512 on p. 26, l.3-12;

a fluorinated epoxide, in particular as described in the document WO 2008/027512 on p. 31, l.6-23;

an aryl sulfide, chosen in particular from benzyl phenyl sulfide, diphenyl sulfide, dibenzyl sulfide, and their combinations.

The stabilizing agents can also be combinations of compounds from all of the different categories above.

Use may in particular be made, as lubricants, of oils of mineral origin, silicone oils, paraffins of natural origin, naphthenes, synthetic paraffins, alkylbenzenes, poly($\alpha$-olefin)s, polyalkene glycols, polyol esters and/or polyvinyl ethers.

Mention may be made, as tracers (agents capable of being detected), of deuterated or nondeuterated hydrofluorocarbons, deuterated hydrocarbons, perfluorocarbons, fluoroethers, brominated compounds, iodinated compounds, alcohols, aldehydes, ketones, nitrous oxide and the combinations of these. The tracer is different from the heat-transfer compound or compounds making up the heat-transfer fluid.

Mention may be made, as solubilizing agents, of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat-transfer compound or compounds making up the heat-transfer fluid.

Mention may be made, as fluorescent agents, of naphthalimides, perylenes, coumarins, anthracenes, phenanthracenes, xanthenes, thioxanthenes, naphthoxanthenes, fluoresceins and the derivatives and combinations of these.

Mention may be made, as odorous agents, of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and the combinations of these.

The heat-transfer process according to the invention is based on the use of an installation comprising a vapor compression circuit which contains a heat-transfer fluid. The heat-transfer process can be a process in which a fluid or a body is heated or cooled.

The vapor compression circuit containing a heat-transfer fluid comprises at least one evaporator, one compressor, one condenser and one expansion device, and also lines for transporting heat-transfer fluid between these components. The evaporator and the condenser comprise a heat exchanger which makes possible an exchange of heat between the heat-transfer fluid and another fluid or body.

Use may in particular be made, as compressor, of a single-stage or multistage centrifugal compressor or a centrifugal minicompressor. Rotary, piston or screw compressors can also be used. The compressor can be driven by an electric motor or by a gas turbine (for example fed by the exhaust gases from a vehicle, for mobile applications) or by gears.

The installation can comprise a turbine in order to generate electricity (Rankine cycle).

The installation can also optionally comprise at least one heat-exchange fluid circuit used to send heat (with or without change in state) between the heat-transfer fluid circuit and the fluid or body to be heated or cooled.

The installation can also optionally comprise two (or more) vapor compression circuits containing identical or distinct heat-transfer fluids. For example, the vapor compression circuits can be coupled to one another.

The vapor compression circuit operates according to a conventional vapor compression cycle. The cycle comprises the change in state of the heat-transfer fluid from a liquid phase (or liquid/vapor two-phase system) to a vapor phase at a relatively low pressure, then the compression of the fluid in the vapor phase up to a relatively high pressure, the change in state (condensation) of the heat-transfer fluid from the vapor phase to the liquid phase at a relatively high pressure, and the reduction in the pressure in order to recommence the cycle.

In the case of a cooling process, heat resulting from the fluid or body which is cooled (directly or indirectly, via a heat-exchange fluid) is absorbed by the heat-transfer fluid, during the evaporation of the latter, this taking place at a relatively low temperature with respect to the environment. The cooling processes comprise air conditioning (with mobile systems, for example in vehicles, or stationary systems), refrigeration and freezing or cryogenic processes.

In the case of a heating process, heat is given up (directly or indirectly, via a heat-exchange fluid) by the heat-transfer fluid, during the condensation of the latter, to the fluid or body which is heated, this taking place at a relatively high temperature with respect to the environment. The installation which makes it possible to carry out the heat transfer is known in this case as a "heat pump".

It is possible to employ any type of heat exchanger for the use of the heat-transfer fluids according to the invention and in particular cocurrentwise heat exchangers or, preferably, countercurrentwise heat exchangers.

The heat-transfer fluids used in the context of the present invention are binary compositions of HFO-1234ze and $NH_3$.

The HFO1234ze can be in the cis form or in the trans form or is a mixture of cis form and trans form in which, preferably, at least 80% or at least 90% or at least 95% or at least 98% or at least 99% of the 1,3,3,3-tetrafluoropropene is in the trans form.

The term "binary composition" is understood to mean either a composition consisting of HFO-1234ze and $NH_3$ or a composition essentially comprising HFO-1234ze and $NH_3$ but which can comprise impurities in a proportion of less than 1%, preferably less than 0.5%, preferably less than 0.1%, preferably less than 0.05% and preferably less than 0.01%.

According to specific embodiments, the proportion of HFO-1234ze in the heat-transfer fluid can be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

According to specific embodiments, the proportion of $NH_3$ in the heat-transfer fluid can be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

It may be preferable not to have an excessively high proportion of $NH_3$ in the mixture, in the context of use as heat-transfer fluid, in order to avoid an excessively high increase in temperature at the outlet of the compressor.

Among the above compositions, some exhibit the advantage of being azeotropic or quasi-azeotropic. For example, the azeotrope for the binary mixture HFO-1234ze/$NH_3$ is obtained for a proportion of $NH_3$ of approximately 81 mol% (±4%), at a temperature of 5° C. (±1° C.) and at a pressure of 5.6 bar (±0.5 bar).

The term "quasi-azeotropic" denotes the compositions for which, at a constant temperature, the saturated liquid pressure and the saturated vapor pressure are virtually identical (the maximum difference in pressure being 10%, indeed even advantageously 5%, with respect to the saturated liquid pressure).

For "azeotropic" compositions, at a constant temperature, the maximum difference in pressure is in the vicinity of 0%.

These heat-transfer fluids exhibit an advantage of ease of use. In the absence of significant glide, there is no significant change in the circulating composition and no significant change either in the composition in the event of leakage.

In addition, some compositions according to the invention exhibit improved performances in comparison with some known heat-transfer fluids, in particular for moderate-temperature cooling processes, that is to say those in which the temperature of the cooled fluid or body is from −15° C. to 15° C., preferably from −10° C. to 10° C., more particularly preferably from −5° C. to 5° C. (ideally approximately 0° C.).

Furthermore, some compositions according to the invention exhibit improved performances in comparison with some known heat-transfer fluids, in particular for moderate-temperature heating processes, that is to say those in which the temperature of the heated fluid or body is from 30° C. to 80° C., preferably from 35° C. to 55° C., or particularly preferably from 40° C. to 50° C. (ideally approximately 45° C.).

In the "moderate-temperature cooling or heating" processes mentioned above, the inlet temperature of the heat-transfer fluid at the evaporator is preferably from −20° C. to 10° C., in particular from −15° C. to 5° C., more particularly preferably from −10° C. to 0° C. and for example approximately −5° C.; and the temperature of the start of the condensation of the heat-transfer fluid in the condenser is preferably from 25° C. to 90° C., in particular from 30° C. to 70° C., more particularly preferably from 35° C. to 55° C. and for example approximately 50° C. These processes can be refrigeration, air conditioning or heating processes.

Some compositions are also appropriate for high-temperature heating processes, that is to say those in which the temperature of the heated fluid or body is greater than 90° C., for example greater than or equal to 100° C. or greater than or equal to 110° C., and preferably less than or equal to 120° C.

Some compositions according to the invention exhibit improved performances in comparison with some known heat-transfer fluids, in particular for low-temperature refrigeration processes, that is to say those in which the temperature of the cooled fluid or body is from −40° C. to −10° C., preferably from −35° C. to −25° C., more particularly preferably from −30° C. to −20° C. (ideally approximately −25° C.).

In the "low-temperature refrigeration" processes mentioned above, the inlet temperature of the heat-transfer fluid at the evaporator is preferably from −45° C. to −15° C., in particular from −40° C. to −20° C., more particularly preferably from −35° C. to −25° C. and for example approximately −30° C.; and the temperature of the start of the condensation of the heat-transfer fluid in the condenser is preferably from 25° C. to 80° C., in particular from 30° C. to 60° C., more particularly preferably from 35° C. to 55° C. and for example approximately 40° C.

More generally, the compositions according to the invention can be used to replace any heat-transfer fluid in any heat-transfer application, for example in motor vehicle air conditioning. For example, the compositions according to the invention can be used to replace:

1,1,1,2-tetrafluoroethane (R134a);
1,1-difluoroethane (R152a);
1,1,1,3,3-pentafluoropropane (R245fa);
mixtures of pentafluoroethane (R125), 1,1,1,2-tetrafluoroethane (R134a) and isobutane (R600a), namely the R422 products;
chlorodifluoromethane (R22);
the mixture of 51.2% chloropentafluoroethane (R115) and 48.8% chlorodifluoromethane (R22), namely R502;
any hydrocarbon;
the mixture of 20% difluoromethane (R32), 40% pentafluoroethane (R125) and 40% 1,1,1,2-tetrafluoroethane (R134a), namely R407A;
the mixture of 23% difluoromethane (R32), 25% pentafluoroethane (R125) and 52% 1,1,1,2-tetrafluoroethane (R134a), namely R407C;
the mixture of 30% difluoromethane (R32), 30% pentafluoroethane (R125) and 40% 1,1,1,2-tetrafluoroethane (R134a), namely R407F;
R1234yf (2,3,3,3-tetrafluoropropene);
R1234ze (1,3,3,3-tetrafluoropropene).

The compositions according to the invention can also be used as blowing agent, propellant (for example for an aerosol), cleaning agent or solvent, in addition to their use as heat-transfer fluids.

As propellant, the compositions according to the invention can be used alone or in combination with known propellants. The propellant comprises, preferably consists of, a composition according to the invention. The active substance which has to be ejected can be mixed with the propellant and inert compounds, solvents or other additives, in order to form a composition to be ejected. Preferably, the composition to be ejected is an aerosol.

As blowing agent, the compositions according to the invention can be included in a blowing composition, which preferably comprises one or more other compounds capable of reacting and of forming a foam or cellular structure under appropriate conditions, as is known to a person skilled in the art.

In particular, the invention provides a process for the preparation of an expanded thermoplastic product comprising first the preparation of a polymeric blowing composition. Typically, the polymeric blowing composition is prepared by plasticizing a polymer resin and by mixing in the compounds of a blowing agent composition at an initial pressure. The plasticizing of the polymer resin can be carried out under the effect of heat, the polymer resin being heated in order to soften it sufficiently to mix in a blowing agent composition. Generally, the plasticizing temperature is close to the glass transition temperature or to the melting point for the crystalline polymers.

Other uses of the compositions according to the invention comprise the uses as solvents, cleaning agents or others. Mention may be made, for example, of vapor degreasing, precision cleaning, the cleaning of electronic circuits, dry cleaning, abrasive cleaning, solvents for the deposition of lubricants and release agents, and other solvent or surface treatments.

EXAMPLES

The following examples illustrate the invention without limiting it.

Example 1

Azeotropic or Quasi-Azeotropic Compositions

A vacuum cell equipped with a sapphire tube is cooled to 5° C. with an oil bath. Once thermal equilibrium has been reached, the cell is charged with HFO-1234ze and the pressure at which the equilibrium is reached is recorded. An amount of $NH_3$ is introduced into the cell and the contents are mixed in order to accelerate the equilibration. At equilibrium, a minimum amount of sample is withdrawn from the gas phase and from the liquid phase for gas chromatography analysis with a thermal detector.

The equilibrium data obtained with different compositions of HFO-1234ze (trans-1,3,3,3-tetrafluoro-1propene) and $NH_3$ are represented in FIG. 1.

The invention claimed is:

1. A binary composition consisting of 1,3,3,3-tetrafluoropropene and ammonia and optionally less than 0.5% impurities.

2. The composition as claimed in claim 1, wherein there is from 40% to 99% of ammonia and from 1% to 60% of 1,3,3,3-tetrafluoropropene.

3. The composition as claimed in claim 1, in which the 1,3,3,3-tetrafluoropropene is in the cis form or in the trans form or is a mixture of cis form and trans form.

4. A heat-transfer installation comprising a vapor compression circuit containing a composition as claimed in claim 1 as heat-transfer fluid.

5. The installation as claimed in claim 4, chosen from mobile or stationary installations for heat-pump heating, air conditioning, refrigeration or freezing and Rankine cycles.

6. A process for heating or cooling a liquid or a body by means of a vapor compression circuit comprising a heat-transfer fluid, said process successively comprising the evaporation of the heat-transfer fluid, the compression of the heat-transfer fluid, the condensation of the heat fluid and the reduction in pressure of the heat-transfer fluid, in which the heat-transfer fluid is a composition as claimed in claim 1.

7. The process as claimed in claim 6, which is a process for cooling a fluid or a body, in which the temperature of the cooled fluid or body is from −15° C. to 15° C.; or which is a process for heating a fluid or a body, in which the temperature of the heated fluid or body is from 30° C. to 90° C.

8. The process as claimed in claim 6, which is a process for cooling a fluid or a body, in which the temperature of the cooled fluid or body is from −40° C. to −10° C.

9. The process as claimed in claim 6, which is a process for heating a fluid or a body, in which the temperature of the heated fluid or body is greater than 90° C.

10. A process for reducing the environmental impact of a heat-transfer installation comprising a vapor compression circuit containing an initial heat-transfer fluid, said process comprising a stage of replacement of the initial heat-transfer fluid in the vapor compression circuit by a final transfer fluid, the final transfer fluid exhibiting a lower GWP than the initial heat-transfer fluid, in which the final heat-transfer fluid is a composition as claimed in claim 1.

11. The composition as claimed in claim 1, comprising from 78% to 85% of ammonia and from 15% to 22% of 1,3,3,3-tetrafluoropropene.

12. The composition as claimed in claim 1, in which the 1,3,3,3-tetrafluoropropene is a mixture of cis form and trans form and, in which, at least 80% of the 1,3,3,3-tetrafluoropropene is in the trans form.

13. The composition as claimed in claim 1, in which the composition is azeotropic.

14. The composition according to claim 1, wherein the binary composition is quasi-azeotropic.

15. The composition according to claim 1, the composition consisting of 1,3,3,3-tetrafluoropropene and ammonia.

16. A heat-transfer composition consisting of 1,3,3,3-tetrafluoropropene and ammonia and optionally less than 0.5% impurities and also optionally one or more additives chosen from lubricants, stabilizing agents, surfactants, tracers, fluorescent agents, odorous agents, solubilizing agents and their mixtures.

17. The heat transfer composition as claimed in claim 16, in which the composition is quasi-azeotropic or azeotropic.

18. A composition comprising a refrigerant consisting of 1,3,3,3-tetrafluoropropene and ammonia.

19. The composition according to claim 18, wherein the composition is quasi-azeotropic or azeotropic.

20. The composition according to claim 18, in which the 1,3,3,3-tetrafluoropropene is a mixture of cis form and trans form and, in which, at least 80% of the 1,3,3,3-tetrafluoropropene is in the trans form.

21. A blowing agent comprising:
   a binary composition consisting of 1,3,3,3-tetrafluoropropene and ammonia and optionally less than 0.5% impurities; and
   optionally one or more other compounds capable of reacting and of forming a foam or cellular structure.

* * * * *